United States Patent Office 2,873,276
Patented Feb. 10, 1959

2,873,276

ANTIBIOTIC PURIFICATION AND COMPLEX COMPOUNDS

Edwin W. Blase, Huntington Station, N. Y., assignor to Chas. Pfizer & Co., Inc., Brooklyn, N. Y., a corporation of Delaware No Drawing. Application May 18, 1956
Serial No. 585,627

4 Claims. (Cl. 260—295)

This invention is concerned with a method for the purification of the broad-spectrum antibiotic oxytetracycline and with certain complex compounds of this antibiotic.

Oxytetracycline, which is available commercially under the registered trademark Terramycin, is a broad-spectrum antibiotic of considerable value in therapy. The antibiotic is referred to herein as an oxytetracycline antibiotic. This term is meant to include not only the amphoteric compound, but also salts of this compound with metals such as the alkali metals or alkaline earth metals, or with other polyvalent metals and with acids such as the mineral acids.

Oxytetracycline is normally produced by fermentation, for instance with the use of the organism *Streptomyces rimosus*. In this case, the antibiotic is obtained in the fermentation as a dilute aqueous solution, highly contaminated with a variety of organic and inorganic impurities from which it must be separated in order that it may be used as a pharmaceutical. Even when the antibiotic is to be used as an industrial bactericide or for animal feed enrichment, it is often desirable to bring about at least a partial purification and to isolate the antibiotic in the form of a solid compound more readily blended with other materials such as animal feeds.

The present application is a continuation-in-part based on U. S. Serial No. 412,647, filed February 24, 1954, and now abandoned, which in turn is based on an earlier filed, now abandoned application, Serial No. 194,566, filed on November 7, 1950, by Edwin W. Blase.

It has been found that oxytetracycline may be precipitated from impure dilute aqueous solutions thereof in the form of a product of limited aqueous solubility by treating the impure aqueous solution of the antibiotic with certain organic bases. The organic bases used in the precipitation of the antibiotic must have certain properties in order that they may be used for the precipitation. In general, these must be of sufficiently high molecular weight so that a precipitate of low solubility is formed and yet the organic bases must not be of too high a molecular weight or their solubility in water is so limited that inefficient precipitation, if any, is obtained. The presence of polyvalent metallic ions in the aqueous solution from which the antibiotic is precipitated seems to be essential for the most successful operation of the process. Normally fermentation broths contain an appreciable amount of such polyvalent metals, generally in the form of calcium, magnesium or other non-toxic polyvalent ions. If insufficient is present, it can readily be added to the solution to assure the most complete precipitation of the antibiotic by means of the organic base.

A variety of different organic bases, including organic amines and quaternary ammonium compounds may be used in the present process to prepare the new basic complexes of oxytetracycline. In general, an organic base having a reasonable solubility in water and yet of sufficiently high molecular weight is preferred so that a metallo-organic base complex is formed with the oxytetracycline which has a sufficiently low solubility in water to make possible the recovery of the antibiotic from typical fermentation broths. These compounds, of course, vary in their quantitative efficiency, some of them removing only a minor part of the microbiological activity from higher potency broths, others removing 75% or more of the potency. The following classes of organic bases have been found to be particularly effective in the process. It should be realized that a number of organic bases having similar structures may be found which work more or less efficiently in the same process.

(a) Primary alkyl amines having from 6 to 12 carbon atoms in a straight or branched chain. This includes such compounds as n-octylamine, n-hexyamine, 1-methylheptylamine, decylamine, and so forth.

(b) Secondary alkyl amines in which two alkyl groups having between 6 and 9 carbon atoms are attached to the nitrogen. These chains may be straight or branched and the alkyl groups may be identical or differ within the indicated limitation. Examples of this type of compound are di-n-hexylamine, di-n-octylamine, n-hexyl-n-octylamine, di-2-ethylhexylamine, di-heptylamine.

(c) 1-short chain alkyl (or 1-hydroxy substituted short chain alkyl)-2-long chain alkyl-imidazolines. In these compounds, the short chain alkyl group has between 1 and 4 carbon atoms and an hydroxyl group may be substituted on any of these carbon atoms. The alkyl group on the 2-position has between 7 and 17 carbon atoms. A number of these compounds are commercially available and they include such compounds as Amine C (Geigy Chemical Corporation), Amine O (Geigy), Amine S (Geigy), Amine 121 (a 1-β-hydroxyethylimidazoline prepared from the mixture of amines derived commercially from coconut oil, such that the 2-position of the imidazoline is substituted with a mixture of alkyl groups of from about 7 to 17 carbon atoms).

(d) Primary phenyl alkyl amines in which the alkyl group has 1 to 3 carbon atoms such as benzylamine, phenethylamine, α-methylbenzylamine, α-ethylbenzylamine and so forth.

(e) Long chain alkyl-tri-short chain alkyl ammonium halides wherein the long chain has 8 to 18 carbon atoms, the short chains have 1 to 3 carbon atoms and the halide is chloride, bromide, or iodide. A variety of these compounds are commercially available and useful in this process, such as octadecyl-trimethylammonium chloride, decyl-triethylammonium chloride, dodecyl-trimethylammonium bromide, cetyl-trimethylammonium chloride, mixtures of trimethylammonium salts of the mixture of amines derived by a commercially operated process from soybean fatty acids, from coconut oil fatty acids and from other such sources.

(f) Long chain alkyl-di-short chain alkyl-benzylammonium halides wherein the long chain alkyl group has from 8 to 18 carbon atoms, the short chain alkyl groups have from 1 to 3 carbon atoms each and the halide is either chloride, bromide, or iodide. A number of these compounds are commercially available or may be easily prepared such as cetyl-dimethylbenzyl-ammonium-chloride, Onyx BTC 824 (a mixed alkyl-dimethylbenzyl-ammonium chloride), Onyx BTC 927 (a mixed alkyl-dimethyl-(dimethylbenzyl)-ammonium chloride), dodecyl-diethyl-benzylammonium bromide.

(g) (Medium chain alkyl) benzyl-tri-short chain alkyl ammonium halides wherein the medium chain attached to the benzyl group (at the ortho, meta or para position) has 4 to 8 carbon atoms and the short chain alkyl groups have 1 to 3 carbon atoms each. Compounds of this nature are commercially available and include (tertiary-butyl)benzyl-trimethylammonium chloride, (tertiary-octyl)benzyl-triethylammonium chloride, (n-hexyl)benzyl-tripropylammonium bromide, etc.

(h) Di-medium chain alkyl-di-short chain alkyl ammonium halides wherein the medium chain alkyl groups have from 6 to 18 carbon atoms, and the short chain alkyl groupss have 1 to 3 carbon atoms. The halide is bromide, chloride, or iodide. Examples include didodecenyl dimethyl ammonium chloride, dioctyl dipropyl ammonium bromide, didecyl diethyl ammoniu iodide, di-2-ethylhexyl diethyl amonium chloride, etc.

(i) 1-short chain alkyl-2-long chain alkyl-3-short chain alkyl (or benzyl) imidazolinium halides wherein the short chain alkyl group has from 1 to 4 carbon atoms and may be substituted with an hydroxyl group on any one of these carbon atoms. The long chain alkyl group has from 7 to 17 carbon atoms. A number of these compounds are commercially available, being formed by quaternization of the corresponding imidazoline compounds with an alkyl halide or an aralkyl halide. Examples of this type of compound include Quaternary 121Qb which is an imidazolinium chloride with a β-hydroxyethyl substituent at the 1-position and a benzyl group at the 3-position prepared from the imidazoline formed from the amines derived from coconut oil fatty acids and Quaternary 121Qc, a compound of similar structure with a chlorobutyl group at the 3-position.

(j) (Medium chain alkyl)phenoxyethoxyethyl di-short chain alkyl benzyl ammonium halides wherein the medium chain alkyl is branched or straight, has 6 to 12 carbons, and it is attached at the ortho, meta or para position to the phenoxy group, the short chain alkyls have 1 to 3 carbons each, and the halide is chloride, bromide or iodide. Examples of such compounds are p-(di-tertiary butyl)phenoxyethoxyethyl dimethyl benzyl ammonium chloride, p-hexyl-phenoxyethoxyethyl diethyl benzyl ammonium bromide, o-decyl-phenoxyethoxyethyl dipropyl benzyl ammonium iodide, etc.

(k) N,N'-di((medium chain alkyl benzyl) dimethyl ammonium acetyl) ethylenediamine dihalide wherein the medium chain alkyl substituted on the ring of the benzyl group is of 6 to 12 carbons and the halide is chloride, bromide, or iodide. Examples include the p-di-tertiary butyl benzyl compounds, the o-hexyl compounds, the p-dodecyl compounds, etc.

(l) N-(long chain alkanoyl ethanolaminoformylmethyl)pyridinium halides, wherein the long chain alkanoyl group is a carboxylic acid group having 8 to 18 carbons and the halide is bromide, chloride or iodide. Examples include N-(lauroyl ethanolaminoformylmethyl)pyridinium chloride (Emcol E 607), N-(stearyl-ethanolaminoformylmethyl)pyridinium bromide, N - (tetradecanoyl ethanolaminoformylmethyl)pyridinium iodide.

One particularly useful basic organic precipitant for oxytetracycline fermentation broths is the material known as Arquad C. This is available commercially as a 50% by weight solution in isopropanol or a 33% aqueous solution. It consists of a technical mixture comprising about 50% dodecyl-trimethylammonium chloride, together with lesser amounts of octadecyl-, tetradecyl-, hexadecyl-, octadecenyl-, octyl- and decyl-trimethylammonium chlorides. The small amount of isopropanol introduced when that solution is used does not interfere seriously with the efficiency of precipitation of the oxytetracycline antibiotic complexes. As little as 0.5% by volume of the 33% aqueous solution may be used quite successfully in the present process and fermentation broths are generally thereby reduced in potency to less than 100 mcg./ml. Decreasing the proportion of reagent tends to leave more of the oxytetracycline still dissolved in solution. It is usually practical to increase the proportion up to about 2%. Excess precipitant may partially dissolve the precipitate. In general, a proportion of about 1 to about 5 grams on a dry basis of this particular reagent per liter of broth is preferred. Other precipitants are also effective in approximately this proportion, although the lower molecular weight compounds are required in somewhat smaller amounts and higher molecular weight materials in somewhat larger amounts.

The completeness of precipitation of oxytetracycline from aqueous solutions, especially fermentation broths with organic bases, varies with the pH to which the solution is adjusted. The use of pH's lower than about 5.5 is impractical while pH's from about 6 to about 10 give excellent results. Since the stability of oxytetracycline decreases with higher pH's, a pH of approximately 8.0 to 9.5 is most effective. The procedure generally employed in recovering oxytetracycline from a microorganism fermentation broth is to filter the mycelium from the acidified broth, add the desired organic base precipitant (which may be in the form of one of the above amines or as a water soluble salt of such amine, e. g. the hydrochloride, hydrobromide, acetate, citrate, tartrate, etc. or one of the quaternary compounds) and then adjust the pH of the solution with a soluble alkali, such as caustic soda or potash. Other alkalies such as sodium carbonate, potassium carbonate, lithium hydroxide, lime, and so forth may be used for this purpose. It has been observed that the rapid addition of an alkaline solution tends to precipitate a finely divided product which may be difficult to filter. Slower addition gives a more readily filterable product.

Precipitates which are obtained by treatment of oxytetracycline antibiotic solutions with the various operable organic bases described above in the presence of polyvalent metallic ions do not consist of simple salts of the antibiotic and the chosen base, but rather are complex salts thereof containing various metallic ions which are precipitated during the process. This may be demonstrated by the fact that no appreciable precipitate results upon treating a dilute aqueous solution of pure oxytetracycline antibiotic, comparable in concentration to a conventional oxytetracycline antibiotic fermentation broth, with an amine or quaternary ammonium salt which is known to precipitate the oxytetracycline from fermentation broths. However, the addition of small amounts of bi- or trivalent metallic ions to such a pure oxytetracycline solution causes ready precipitation of complex antibiotic compounds. These contain, in addition to the antibiotic, the organic base and one or more polyvalent metallic ions. The latter are normally present in fermentation broths. For instance, a typical precipitate obtained from an oxytetracycline fermentation broth treated with Arquad C was analyzed and found to contain approximately 51% oxytetracycline, 19% of the quaternary ammonium compound and 7% ash. The metallic components of the ash were approximately 45% magnesium and about 45% calcium. Since media used in the preparation of oxytetracycline by fermentation vary somewhat in their metallic ion composition, the resulting precipitate obtained by the present process will also vary in its metallic ion content. Normally oxytetracycline antibiotic fermentation media contain sufficient polyvalent metallic ions to assure the maximum precipitation of the antibiotic when a suitable organic base is added to the filtered broth and the pH is adjusted to a suitable basic value. In fact, the broths often contain more metallic constituents than is required, in which case the excess may be preliminarily removed by any desired means; for instance, by the sequestration method taught in U. S. Patent No. 2,658,078. In this method acidic clarified oxytetracycline broth is treated with a sequestering agent for polyvalent metallic ions. Such agents being weakly ionized hydroxylated organic acid compounds, like citric acid or gluconic acid, sodium tetraphosphate and so forth, and amino acids such as ethylenediamine tetraacetic acid and polyaminocarboxylic acid salts such as the commercially-available product "Perma-Kleers." If the oxytetracycline antibiotic broth should contain insufficient metallic ions, iron, zinc, magnesium, calcium, strontium and the like may be added to assist the precipitation still further. In fact, any reasonably soluble polyvalent metallic ion may be used for this purpose. If an impure aqueous solution of oxytetracycline is obtained from another source than fermentation, such polyvalent metals must, of course, be added in order to carry out the precipitation procedure of the present invention. The various organic bases used in the present process vary somewhat in their selectivity as would be expected; that is, the proportion of antibiotic present in the precipitated salts does not remain constant with different precipitants. The composition of the precipitate will also obviously vary somewhat with the pH used during the precipitation.

Although it is possible to use solutions or broths having an oxytetracycline antibiotic potency of 500 mcg./ml. or lower, those are preferred which are somewhat higher in potency, that is, at least about 1000 mcg./ml., in order that the product will have suitably high potency and will be obtained in good yield. The various organic bases vary in their effectiveness of precipitation; for instance, some of the compounds referred to above may precipitate only a portion of a typical broth containing 1000 mcg./ml., others will precipitate 75% or more. In general, only a fraction of the quaternary ammonium salt or other organic base precipitant is found in the resulting precipitate; that is, an excess should be used in order to obtain a reasonably complete recovery of the antibiotic. Somewhat over a three-fold molar excess of the reagent is most successful. This will vary with the individual base and with the nature of the polyvalent metallic ions present in the solution used for the precipitation. A minimum of experimentation will establish the most suitable ratio for a given fermentation broth.

The product which is formed by the precipitation process of the present invention, when separated from solution and dried, generally assays from about 300 to about 500 mcg./mg. of oxytetracycline activity. A one-step operation thus serves greatly to concentrate and purify the antibiotic, since the fermentation broth normally contains, on a dry basis, oxytetracycline at an appreciably lower concentration. The complex salt precipitate may readily be treated to recover pure oxytetracycline or its simple acid salts, or it may be used directly in therapeutic or nutritional fields or as an industrial antibacterial agent. For instance, the quaternary ammonium salts of high molecular weight are particularly strong germicides in their own right showing an activity which is greater than could be expected from the oxytetracycline content and the quaternary ammonium salt content.

The complex metallo-organic salts of oxytetracycline obtained by the present process may be treated to regenerate the oxytetracycline content by dissolving them in lower alcohols and ketones, preferably after the removal of excess moisture by filtration and drying. Methanol is most satisfactory, being low in cost and easily recovered. Other lower alcohols such as ethanol and lower ketones such as acetone are quite useful. An alternative recovery of the antibiotic involves the treatment of the organic base complex in a lower aliphatic alcohol with hydrochloric acid or a polyvalent metallic halide soluble in the solvent to bring about dissolution of the precipitated product. The solution may then be clarified, if desired, by means of a decolorizing adsorbent such as bone black. The addition of further hydrochloric acid to the solution results in the separation of a highly purified, generally crystalline acid salt of oxytetracycline.

In recovering the antibiotic from the precipitate and preparing a crystalline salt, a methanolic solution containing from about 4 to 8 liters of the solvent per kilogram of oxytetracycline activity is generally prepared and then treated with concentrated hydrochloric acid. Care must be exercised to avoid precipitation of amphoteric oxytetracycline. It is particularly convenient to add the dried organic base-oxytetracycline antibiotic precipitate to the methanol solvent while the pH of the solution is continually adjusted from about 2 to about 2.5 by the addition of concentrated hydrochloric acid. Calcium chloride may be used to replace or partially replace the hydrochloric acid in obtaining a clear solution of the antibiotic. Any small amount of solid impurities may be filtered from the solution. Further addition of concentrated acid, for instance, hydrochloric acid, causes formation of the desired simple antibiotic salt, such as the hydrochloride. When hydrochloric acid is used preliminarily to aid dissolution of the complex salt, from about 0.4 to about 0.7 ml. of the concentrated acid (36%) is required to dissolve the metallo-organic salt equivalent to one gram of oxytetracycline antibiotic activity, and solutions having potencies of about 60,000 to 150,000 mcg. of oxytetracycline per ml. or higher are thus prepared. This clear solution may then be treated with an adsorbent-like decolorizing carbon to remove a variety of contaminating impurities. About 0.5 to about 1.5 grams of carbon is generally used per gram of oxytetracycline potency in the solution. A larger proportion may be used giving a product of greater purity without much loss due to adsorption of the antibiotic. The adsorbent may be removed with the assistance of a filteraid and washed with an acidified solvent to remove residual material.

Crystalline oxytetracycline hydrochloride or similar salts of good quality are prepared from the clarified solution thus obtained. This is accomplished by the addition of the salt-forming acid, such as concentrated hydrochloric acid. The acid salt crystallizes from the solution. The solution may be concentrated after crystallization, if desired, to obtain a more complete crystallization of the product. In general a ratio of at least about 200 ml. of concentrated hydrochloric acid per kilogram of the antibiotic present in the solution is required. Somewhat larger amounts of acid may improve the yield of crystalline product and 0.95 liter of the concentrated hydrochloric acid per kilogram of oxytetracycline is a preferred proportion. However, this will vary to some extent with the type of precipitant used and the nature of impurities present in the material. The optimum conditions may be obtained by the minimum experimentation by a skilled individual. The use of more than one liter of acid per kilogram of antibiotic is not recommended since it may lead to some loss of product. Crystallization is most practically conducted at room temperature, although a lower temperature may give a slightly better yield of product. A higher temperature may induce some loss of product.

In addition to regenerating the oxytetracycline by direct crystallization of its acid salts from the metallo organic compounds, regeneration may be effected by dissolving such compounds in an organic solvent like methanol with the aid of an acid. The presence of a minor proportion of water is not harmful. Sulfuric acid is most often used for this purpose. Precipitated impurities such as calcium sulfate are removed by filtration and the pH is raised to a point within the range of from about 5 to about 7. A precipitate containing a high proportion of free amphoteric oxytetracycline is thus obtained. Small amounts of polyvalent metals may be co-precipitated. The presence of a sequestering agent, such as ethylenediamine tetraacetic acid, assists in the preparation of amphoteric antibiotic of higher purity. This may be converted to a crystalline acid salt by conventional means, if desired. Organic solvents may be removed by distillation and replaced by water before filtering. This raises the yield to a certain extent. Alternatively, the product may be filtered and the solvent removed to obtain a second precipitate of somewhat lower potency which may be recycled for further treatment.

In the recovery of pure oxytetracycline antibiotic or its simple acid salts, such as the hydrochloride, from solutions of the metallo-organic complexes, the organic base used as precipitant and some of the antibiotic itself, are left in the mother liquor and wastes. It may be desirable to reclaim and reuse such materials; for instance, if the mother liquor is recycled and added to the next batch of oxytetracycline antibiotic solution or broth to be treated according to the present invention, the amount of organic base required for precipitation may be substantially reduced without appreciably lowering the yield of oxytetracycline precipitated. Part or all of the solvent may first be removed from the mother liquor before its addition to the next batch. This is not essential. Certain colored impurities may be returned in the mother liquor and give a somewhat darker oxytetracycline antibiotic salt product. If the recycled operation is repeated too many times, this darkening of the product may be troublesome and the yield may decrease. However, recycling the mother liquor a few times is feasible and does not harm the quality of the product.

The process of the present invention has many advantages. It uses cheap, readily available reagents of low toxicity, a crystalline salt of high quality is obtained from highly dilute and/or very crude oxytetracycline antibiotic solutions, and the procedure involves a minimum number of steps and produces good yields of the antibiotic.

The following examples are given to illustrate this invention and are not intended to limit its scope.

*Example I*

A volume of acidified filtered oxytetracycline broth containing 25.3 grams of the antibiotic was treated with 5 grams of citric acid per liter of solution to sequester a portion of the polyvalent metallic ions therein. Five ml. of 33% aqueous Arquad C per liter of broth were then added thereto, and the pH of the solution was adjusted to 9 by introducing sodium hydroxide solution over a period of one hour. A complex precipitate containing oxytetracycline, mixed alkyl trimethyl ammonium bases and various metals resulted and was filtered using a filteraid. The residual filtrate was assayed and found to contain 0.83 gram of oxytetracycline activity. The filter cake was dried at 50° C. under vacuum and then milled. The resulting finely divided solid was extracted with sufficient methanol so that a solution containing 136 mg. of oxytetracycline per ml. was obtained. This solution was filtered and concentrated hydrochloric acid was gradually added thereto with constant agitation. Crystalline oxytetracycline hydrochloride separated. It was filtered, washed with acidified methanol and dried. A total of 14.2 grams of purified, crystalline oxytetracycline hydrochloride was thus obtained by a simple procedure.

*Example II*

Filtered oxytetracycline broth containing 25.3 grams of oxytetracycline activity was treated with 0.2% of Arquad C (33% aqueous solution). To this solution was added the mother liquor obtained during the crystallization of the oxytetracycline hydrochloride prepared in Example I. This recycled liquor contained 6.6 grams of oxytetracycline activity. The mixed solution was adjusted to pH 9 by the slow addition of sodium hydroxide solution, and the resulting precipitate was filtered and dried. The filtrate contained 1.08 grams of the antibiotic. The precipitate comprised complex metalloquaternary ammonium salts of oxytetracycline, wherein the total antibiotic content was 29.8 grams. This product was dissolved in methanol and concentrated hydrochloric acid was simultaneously added at the rate of 0.48 ml. of acid per gram of oxytetracycline activity. A solution containing 62.5 mg. of antibiotic per ml. was obtained. This was treated with 0.99 gram of a commercially available activated carbon per gram of oxytetracycline activity. After stirring for ½ hour, the carbon was filtered with the assistance of a filteraid. To the clarified solution was added 0.19 gram of anhydrous calcium chloride per gram of oxytetracycline, in order to prevent the premature crystallization of amphoteric oxytetracycline and to assure formation of oxytetracycline hydrochloride of high quality. To the clear solution was added 0.60 ml. of concentrated hydrochloric acid per gram of antibiotic present. This resulted in the formation of crystalline oxytetracycline hydrochloride. The precipitated crystals were filtered, carefully washed with acidified methanol and then with methanol and dried under vacuum at 50° C. A total of 15.75 grams of the crystalline acid salt was obtained. The mother liquor from the crystallization contained 19.3 mg. of antibiotic per ml., a total of 8.56 grams of the antibiotic. More of the antibiotic was recoverable by a second extraction of the filter cakes and of the decolorizing carbon.

*Example III*

Filtered oxytetracycline broth was treated with a variety of quaternary ammonium chloride salts in aqueous solution and in isopropanol (IPO) solution. Arquad 12 consists principally of dodecyl-trimethylammonium chloride and Arquad 18 is the corresponding octadecyl compound. In the table below are given the volume of reagent used to treat 500 ml. of the oxytetracycline broth, the potency of the exhausted broth after removal of the organic base precipitate and the potency of the precipitate after drying. Each sample of broth was adjusted to pH 9.9 with sodium hydroxide to effect the precipitation.

| Reagent | Volume, ml. | Potency of Filtrate, mcg./ml. | Potency of Dried Product, mcg./mg. |
| --- | --- | --- | --- |
| Arquad C (33% in water) | 2.5 | 45 | 505 |
| Arquad 12 (33% in water) | 2.5 | 40 | 480 |
| Arquad 12 (50% in IPO) | 1.65 | 40 | 515 |
| Arquad 18 (50% in IPO) | 1.65 | 50 | 445 |

It will be noted that changes in the nature of the organic base used do not appreciably alter the effective removal of the antibiotic from the broth or the quality of the product.

*Example IV*

A further group of quaternary ammonium salts and certain amines have been demonstrated to be very effective in the precipitation of oxytetracycline from clarified fermentation broth.

Clarified oxytetracycline fermentation broth was treated with 5 grams of citric acid per liter of broth and to one liter portions of this treated broth was added 5.0 gram portions (5.0 ml. of the liquids) of the reagents listed below. In each case the solution was then adjusted by the addition of dilute sodium hydroxide to a pH from about 8.5 to about 9.0. The precipitated oxytetracycline-containing products were filtered using a small proportion of a filteraid. The filtrates from each of the precipitates were assayed for residual antibiotic by means of a standard biological method. In the following table is reported the reagents under their trade names and generic names, as well as the per cent of oxytetracycline removed from the fermentation broth.

| Reagent | Percent Oxytetracycline Removed from Fermentation Broth |
| --- | --- |
| Alkyl (C8–C18) trimethyl ammonium chloride (Arquad C*) | 93 |
| A substituted Stearyl imidazolinium chloride (Quaternary S*) | 93 |
| Alkylbenzyl trimethyl ammonium chloride (Oronite ATMO50*) | 96 |
| p-Diisobutyl phenoxy ethoxy ethyl dimethyl benzyl ammonium chloride | 96 |
| Cetyl dimethyl benzyl ammonium chloride | 98 |
| Decylamine | 93 |
| Nonylamine | 78 |
| Octylamine | 90 |
| A high molecular weight, heterocyclic, alkyl substituted tertiary amine (Amine-O*) | 96 |
| A high molecular weight, heterocyclic, alkyl substituted teritary amine (Amine-C*) | 88 |

*Trade-name of the commercially available product.

Example V

The process described in Example IV was repeated utilizing as the precipitating agent di-n-hexylamine. A substantial amount of the antibiotic was precipitated from the fermentation broth by the reagent.

Example VI

The process described in Example IV was repeated utilizing as the precipitating agent benzylamine. Part of the antibiotic activity was removed from the broth by the precipitant.

Example VII

The process described in Example IV was repeated utilizing as the precipitating agent dodecyl-diethyl-benzyl-ammonium bromide. This resulted in the precipitation of a major part of the antibiotic from the fermentation broth.

Example VIII

The process described in Example IV was repeated utilizing as the precipitating agent didodecenyl dimethyl ammonium chloride. A major part of the antibiotic separated from the solution as a complex with the organic base and polyvalent metal ions in the broth.

Example IX

The process described in Example IV was repeated utilizing as the precipitating agent 1-$\beta$-hydroxyethyl-2-($C_7$ to $C_{17}$ alkyl)-3-benzyl-imidazolinium chloride (Quaternary 121Q$b$). A substantial part of the antibiotic activity was precipitated.

Example X

The process described in Example IV was repeated utilizing as the precipitating agent 1-ethyl-2-undecyl-3-butyl-imidazolinium bromide as the precipitant. Part of the antibiotic activity was removed from solution by this reagent.

Example XI

The process described in Example IV was repeated utilizing as the precipitating agent p-(di-tertiary-butyl) phenoxyethoxyethyl dimethyl-benzyl ammonium chloride. A major proportion of the oxytetracycline was separated from solution as a precipitate containing the organic base and calcium and magnesium ions.

Example XII

The process described in Example IV was repeated utilizing as the precipitating agent Experimental Quaternary B44 of Rohm & Haas (N,N'-di-(medium chain alkyl benzyl) dimethyl ammonium acetyl) ethylenediamine dichloride.

Example XIII

The process described in Example IV was repeated utilizing as the precipitating agent 1-$\beta$-hydroxyethyl-2-pentadecyl imidazoline. Part of the antibiotic was precipitated as a complex with the organic base and polyvalent metal ions.

Example XIV

The process described in Example IV was repeated utilizing as a precipitant Emcol E 607. A major part of the oxytetracycline in the broth was precipitated as a complex.

What is claimed is:

1. A process for the recovery of oxytetracycline from an aqueous solution thereof obtained from a fermentation broth, which comprises treating said aqueous solution in the presence of polyvalent metal ions at a pH of at least about 5.5 and up to about 10 with at least an excess of one organic base selected from the group consisting of (a) primary alkyl amines having from 6 to 12 carbon atoms; (b) secondary alkyl amines wherein two alkyl groups having between 6 and 9 carbon atoms each are attached to the nitrogen; (c) 1-short chain alkyl-2-long chain alkyl imidazolines wherein the short chain alkyl group has between 1 and 4 carbon atoms and the long chain alkyl has between 7 and 17 carbon atoms; (d) 1-short chain hydroxyalkyl-2-long chain alkyl imidazolines wherein the short chain hydroxyalkyl has between 1 and 4 carbon atoms and the long chain alkyl has between 7 and 17 carbon atoms; (e) primary phenyl-alkyl amines wherein the alkyl group has between 1 and 3 carbon atoms; (f) long chain alkyl tri-short chain alkyl ammonium halides wherein the long chain alkyl has between 8 and 18 carbon atoms and the short chain alkyl has between 1 and 3 carbon atoms and the halide is chosen from the group consisting of chloride, bromide, and iodide; (g) long chain alkyl di-short chain alkyl benzyl ammonium halides wherein the long chain alkyl group has between 8 and 18 carbon atoms, the short chain alkyl group has between 1 and 3 carbon atoms and the halide is chosen from the group consisting of chloride, bromide, and iodide; (h) medium chain alkyl benzyl tri-short chain alkyl ammonium halides wherein the medium chain is attached to the benzyl group and has between 4 and 8 carbon atoms and the short chain alkyl group has between 1 and 3 carbon atoms; (i) di-medium chain alkyl-di-short chain alkyl ammonium halides wherein the medium chain alkyl group has between 6 and 18 carbon atoms and the short chain alkyl group has between 1 and 3 carbon atoms and the halide is chosen from the group consisting of bromide, chloride and iodide; (j) 1-short chain alkyl-2-long chain alkyl-3-short chain alkyl imidazolinium halides wherein the short chain alkyl group has from 1 to 4 carbon atoms, the long chain alkyl group has from 7 to 17 carbon atoms, and the halide is chosen from the group consisting of chloride, bromide and iodide; (k) 1-short chain alkyl-2-long chain alkyl-3-benzyl imidazolinium halides wherein the short chain alkyl group has from 1 to 4 carbon atoms and the long chain alkyl group has from 7 to 17 carbon atoms; (l) 1-short chain hydroxyalkyl-2-long chain alkyl-3-short chain alkyl imidazolinium halides wherein the short chain hydroxyalkyl groups have from 1 to 4 carbon atoms, the long chain alkyl group has from 7 to 17 carbon atoms, and the halide is chosen from the group consisting of chloride, bromide, and iodide; (m) (medium chain alkyl) phenoxyethoxyethyl di-short chain alkylbenzylammonium halides wherein the medium chain alkyl group has from 6 to 12 carbon atoms, the short chain alkyls have between 1 and 3 carbon atoms each, and the halide is chosen from the group consisting of chloride, bromide, and iodide; (n) N,N'-di-((medium chain alkylbenzyl) dimethyl ammonium acetyl) ethylenediamine dihalides wherein the medium chain alkyl group has from 6 to 12 carbon atoms and the halide is chosen from the group consisting of chloride, bromide, and iodide; (o) N-(long chain alkanoyl ethanolaminoformylmethyl)pyridinium halides wherein the long chain alkanoyl group has from 8 to 18 carbon atoms and the halide is chosen from the group consisting of chloride, bromide and iodide; and recovering the metal ion-organic base-oxytetracycline antibiotic complex thereby precipitated.

2. A process as claimed in claim 1 wherein the aqueous oxytetracycline solution is a fermentation broth.

3. A process as claimed in claim 1 wherein the recovered metal ion-organic base-oxytetracycline antibiotic precipitate is treated with dilute acid at a pH below about 5, the antibiotic solution is filtered, and the pH of the filtered solution is adjusted to a value substantially between 5 and 7 and the precipitated oxytetracycline is recovered.

4. The product produced by the process claimed in claim 1.

References Cited in the file of this patent

FOREIGN PATENTS 506,950   Belgium _____ Nov. 30, 1951